Jan. 17, 1956 C. W. RUSSELL 2,730,876
UNIVERSAL JOINT ADAPTER
Filed March 21, 1952 2 Sheets-Sheet 1
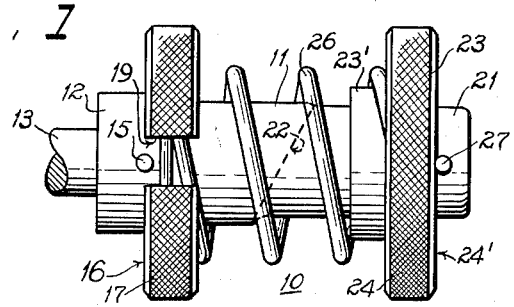
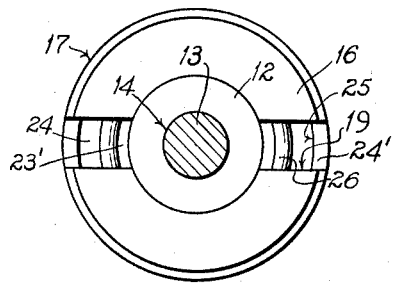
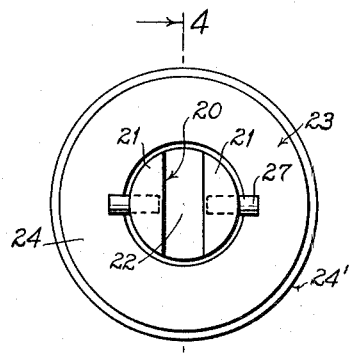
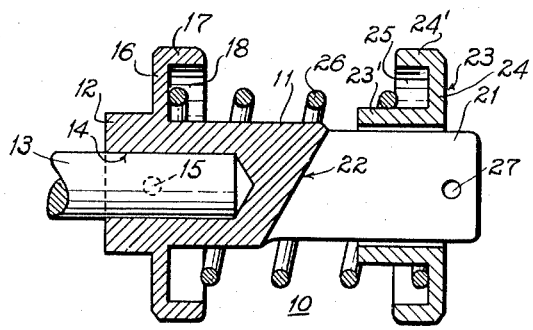
INVENTOR.
Charles W. Russell
BY
ATTORNEY.

Jan. 17, 1956 C. W. RUSSELL 2,730,876
UNIVERSAL JOINT ADAPTER
Filed March 21, 1952 2 Sheets-Sheet 2
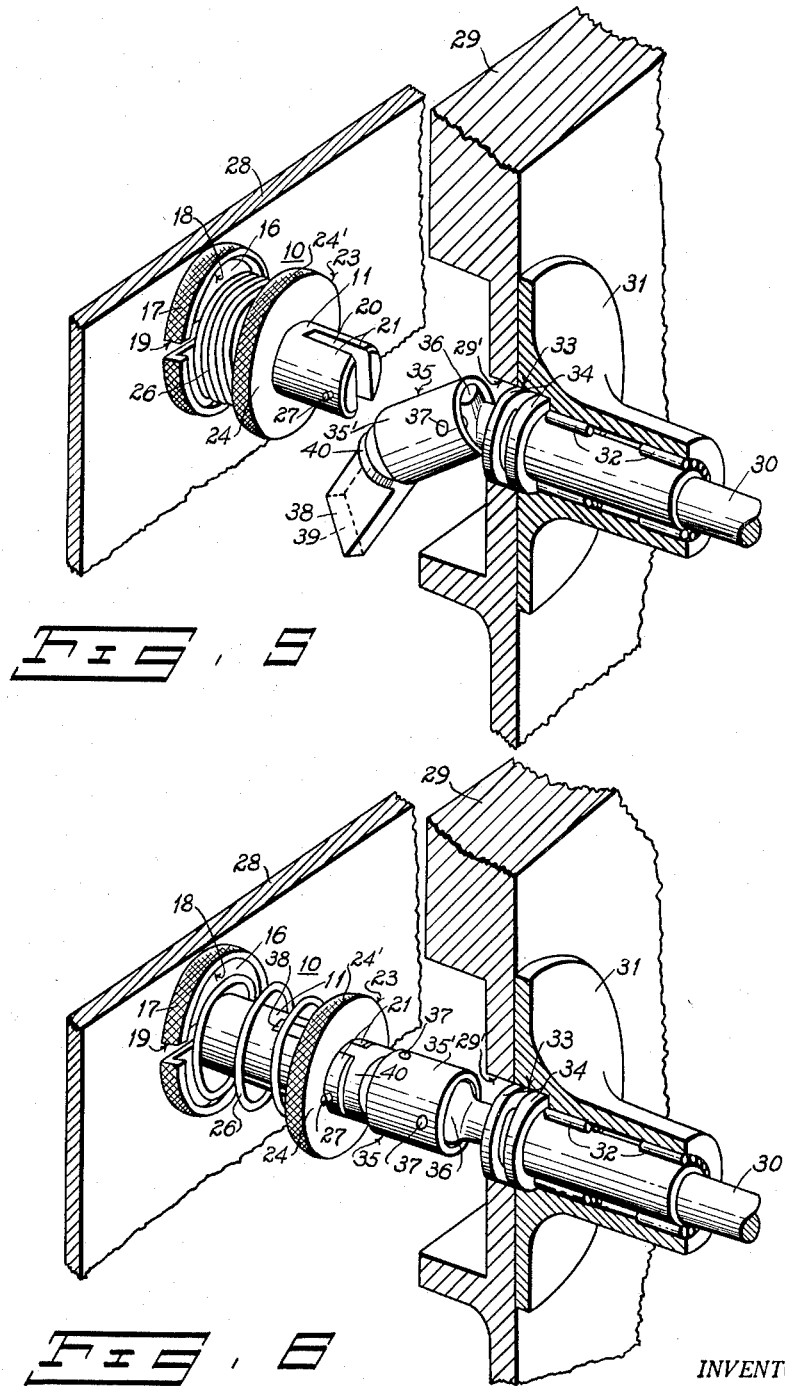
INVENTOR.
Charles W. Russell
BY
ATTORNEY.

United States Patent Office 2,730,876
Patented Jan. 17, 1956

2,730,876

UNIVERSAL JOINT ADAPTER

Charles W. Russell, Huntington, N. Y., assignor to Republic Aviation Corporation, Farmingdale, N. Y., a corporation of Delaware Application March 21, 1952, Serial No. 277,796

1 Claim. (Cl. 64—17)

This invention relates generally to connectors or couplings and particularly to rotary shaft couplings which have all of the strength and durability of the devices heretofore used in connecting components or sections of a shaft or other drive and is distinguished in that it may be quickly and easily placed in its operative position and be as quickly removed.

The present coupling is especially useful in the union of rotary shaft sections or components in locations where the space surrounding the junction between the sections is restricted or limited, since this device requires no tools for its connection and/or disconnection and may, if necessary, be positioned for attachment or removed from attachment by and with only one hand.

Moreover, once the coupling has been assembled in the contemplated connection, its accidental displacement is virtually impossible; and it can be and is maintained in its operative position by the inherent features and characteristics of the coupling without resort to the common rigid methods of bolting mating plates affixed to the adjacent ends of the shaft sections and the like.

With the above and other objects in view, as will be apparent, this invention consists in the construction, combination and arrangement of parts all as hereinafter more fully described, claimed and illustrated in the accompanying drawings, wherein:

Fig. 1 is a side elevation of a connector or coupling embodying the present invention;

Fig. 2 is an end elevation of the device as viewed from the left of Fig. 1;

Fig. 3 is the end elevation of the coupling as viewed from the right of Fig. 1;

Fig. 4 is a longitudinal section taken along the line 4—4 of Fig. 3;

Fig. 5 is a perspective view of the instant coupling in association with an aircraft bulkhead and adjoining mechanism and shows it in disconnected condition; and Fig. 6 is the same view after a connection between shaft sections has been established by the subject coupling.

The present connector or coupling is of general adaptation and utility in uniting the components or sections of a shaft for the quick assembly and/or disassembly thereof. However, it has particular utility in the connection of rotary elements of the control systems of airplanes, where the space available for the establishment or disengagement of the connection is usually restricted or limited. Moreover, the simple, light-weight design of the instant connector is especially directed to the manufacture of aircraft, where weight is critical.

Prior to this invention it has been customary to provide the drive shafts of aircraft control mechanisms, such as computers and the like, with a coupling or connector adjacent such mechanisms to the end that the mechanism may be installed and/or removed when necessary without unduly disturbing the airplane structure. These prior connectors normally involve the use of splines, abutting plates and bolts or equivalent devices which are objectionable because of the restricted working space usually available at and near the point of connection and the difficulty in manipulating tools and working with both hands in this limited available space. Moreover, in many instances these control boxes or computer mechanisms are mounted on cushions or floats which render them movable relative to adjacent bulkheads and other fixed structure through which the shaft may pass. It is, therefore, customary to employ a universal joint in the shaft adjoining the connector to accommodate this movement. Manifestly, the use of a universal joint adds to the problem of assembling and disassembling the connector or coupling in the limited available space.

The present invention overcomes most, if not all, of the objectionable characteristics of these prior devices by providing a unitary assembly which may be installed or removed from its operative position by and with only one hand of the mechanic and without the use of tools. It is also possible with this connector to provide a coupling which, once having been placed in its operative position, will remain there until it is intentionally removed or disengaged. Moreover, the present connector may be rapidly removed and replaced in its operative position without the destruction or impairment of any of its parts.

Reference being had more particularly to Figs. 1 to 4 inc. of the drawings, 10 designates generally the unitary coupling assembly contemplated by this invention. This coupling consists of a body portion or shank 11 which terminates at one end in a head 12 and at the other in a bifurcation 20 creating the spaced parallel arms 21. A concentric or central bore or socket 14 is provided in the head 12 and extends longitudinally through part of the shank 11 to a point short of the bifurcation 20. The function of this socket 14 is to receive the end of a drive shaft 13 that projects from a control box, computer or the like and which may be therein secured by a transverse pin 15, transpiercing the shank 11 and the end portion of said shaft disposed within the socket. It is expected and preferred that this projecting shaft 13 be made relatively short so as to locate the end face of the shank 11 when connected to it, as set forth above, in substantial abutment against the wall of the control box or computer mechanism from which the shaft 13 projects.

Ajoining the head 12 of shank 11 is flange 16 which may be integral with or otherwise fixedly secured to the shank 11 and which projects radially from and encircles said shank. The outer edge or periphery of the flange 16 has a lateral lip 17 disposed normal to the flange 16 and projecting therefrom in the direction of the arms 21 thereby creating a cup 18 defined by one face of the flange 16, the shank 11 and the lip 17. Diametrically opposed, comparatively small portions of the flange 16 and lip 17 are removed in the plane of the pin 15, as at 19, to allow access to said pin.

At the other or opposite end of shank 11 the parallel arms 21 are created by bifurcating the shank 11, as at 20. The width of the bifurcation 20 is such as to allow ample space for the reception of the tongue 38 as will be described. At the same time a wall or face 22 is created at base of the bifurcation 20 between the arms 21. This wall 22 is disposed angularly relative to the planes of the opposite extremities of the shank 11 for reasons to be explained more fully.

Slideably mounted on the shank 11 is a collar 23 which consists of a central, relatively wide bearing 23' embracing and operatively engaging the shank 11 and a flange 24 integral with or otherwise fixedly secured to the bearing 23', to project outwardly from one end of said bearing. The flange 24 is similar to flange 16 in that it is of substantially the same diameter and is provided with a lateral or transverse lip 24' at its outer edge to create a cup 25 resembling the cup 18 of head 12. However, it is to be noted that the cups 18 and 25 are in opposition one to the other, i. e., they open toward each other.

A coil spring 26 is positioned on and encircles the shank 11 and thereby insure a unitary assembly stoptively of head 12 and collar 23. The function of the spring 26 is to maintain the spaced relationship of the flange 16 and the collar 23 due to the constant expanding action of said spring against the flange 16 and upon the movable collar 23.

In order to retain the movable collar 23 on the shank 11 and thereby insures a unitary assembly stops 27 are provided. These stops are diametrically opposed pegs or pins which are secured in, and project transversely from, the shank 11 adjacent the outer extremities of arms 21. More specifically, a stop 27 is press fitted in a complementary hole provided in each arm 21 so as to be in diametric alignment one with the other and abut the outer face of the collar 23 to thereby arrest or limit the outward movement thereof on the shank 11 under the influence of the spring 26.

In Figs. 5 and 6, an example of a specific use or adaptation of the coupling or connector 10 shown in Figs. 1 to 4 inc. is illustrated. In this instance one wall 28 of a computer mechanism for the adjustment of the gun-bomb-rocket sight of an airplane is disposed, when the mechanism is installed, in close proximity to a bulkhead 29 within the fuselage of the airplane. This mechanism is controlled by remote means located in the cockpit through a drive shaft 30, which is operatively installed between said remote control means and the bulkhead 29 in any conventional manner. In transpiercing the hole 29' in bulkhead 29 the shaft 30 is mounted in and through a journal 31 immovably secured to a face of said bulkhead in opposition to the computer. This journal 31 is provided with any suitable anti-friction bearings 32.

A cavity 33 is provided in that end of the journal 31 which abuts the bulkhead 29 and is contiguously associated with the hole 29' therein. Both the hole 29' and the cavity 33 are enlarged or oversized relative to the diameter of the shaft 30 for accommodation therein of a seal, such as for example O-rings 34 which encircle said shaft so as to fill and close the cavity 33 and hole 29'. The seal 34 for the opening 29' is necessary to prevent air leakage through said opening occasioned by differential pressures on opposite sides of the bulkhead 29; atmospheric pressure being maintained on one side of the bulkhead while super-atmospheric pressure is maintained on the opposite side thereof.

Since the computer 28 is mounted for limited, universal movement relative to the stationary bulkhead 29, a flexible or universal joint 35 is incorporated in or attached to the shaft 30 at the end thereof near the computer wall 28. This joint 35 may be of any construction, but is here shown as consisting of a sleeve 35' with the balls 36 mounted in the end portions thereof on pivots 37 disposed at right angles one to the other. One of the balls 36 is affixed to the extremity of the shaft 30 projecting through and adjoining the bulkhead 29 while the other ball 36 is affixed to the tongue 38. Thus the universal joint 35 is interposed between the shaft 30 and the tongue 38 so that the latter and anything connected to it is capable of universal movement relative to the bulkhead 29 and shaft 30.

It is pointed out that the end surface 39 of the tongue 38 slopes or is disposed at an angle to correspond to angle of the wall 22 against which it is to abut upon insertion of the tongue between the arms 21 and into the bifurcation 20. At the end of tongue 38 opposed to the end surface 39 is an integral collar 40 which overlies the end surfaces of the arms 21 when the tongue 38 is disposed between said arms.

After the present coupling or connector 10 has been assembled and fixedly secured to the drive shaft 13 of the computer whereby it projects from the wall 28 of the computer as above described, it, as a unit, is incapable of shifting movement relative to said wall. To connect the coupling 10 to the shaft 30 and thereby connect the shaft 30 to the drive shaft 13 of the computer 28 the collar 23 is retracted on the shank 11 against the action of the spring 26 toward the flange 16 thereby uncovering the bifurcation or space 20 between the arms 21 to permit the insertion of the tongue 38. This is accomplished by swinging the tongue 38 about one or the other of the pivots 37 until it seats in the space 20 with its end face 39 in substantially flush contact with the end or face of wall 22. The return of the collar 23 under the influence of the spring 26 to its normal position causes it to engage and encircle the arms 21 and the tongue 38 and thereby prevent any displacement of the tongue laterally of the shank 11 and arms 21.

What is claimed is:

In an aircraft the combination with a stationary bulkhead and the housing of a mechanism located in close proximity to, and parallelly spaced from said bulkhead, said housing being organized and arranged for limited universal movement relative to said bulkhead and a pair of rotary shafts one projecting from the bulkhead and the other projecting from the housing, of a sleeve pivoted to the end of one of said shafts, a tongue pivoted to the sleeve at right angles to the pivot connecting the sleeve to said shaft, the outer extremity of said tongue being angularly sloped relative to its body, a shank terminating at one of its ends in an unobstructed bifurcation having an end wall disposed complementary to the sloping extremity of the tongue aforesaid and adapted to receive said tongue therein to completely and matingly fill said bifurcation and terminating in a socket at its other end fixedly attached to the end of the other of said shafts, locking means consisting of a flange fixedly projecting from the shank adjacent the socketed end thereof and provided with a peripheral lip combining with the flange to create a cup facing toward the bifurcated end of the shank, a collar mounted for reciprocation on the shank and provided with a peripheral lip combining with said collar to create a cup facing toward the fixed cup of the shank, a coiled spring encircling said shank having its opposed ends seated one in each of said cups and normally acting to move said collar to dispose it over and around the bifurcation and thereby secure said tongue therein against lateral movement only, and a lateral projection from the outer surface of each of the arms of the bifurcation adjacent the outer extremity thereof to arrest the movement of the collar by said spring.

References Cited in the file of this patent

UNITED STATES PATENTS

| 1,285,651 | Eden | Nov. 26, 1918 |
| 1,695,564 | Thomas | Dec. 18, 1928 |
| 1,893,396 | Bullough | Jan. 3, 1933 |
| 2,278,308 | Fairchild | Mar. 31, 1942 |
| 2,296,518 | Greer et al. | Sept. 22, 1942 |

FOREIGN PATENTS

| 211,984 | Germany | July 17, 1909 |
| 622,977 | France | 1927 |